United States Patent
Allen et al.

(10) Patent No.: US 6,392,747 B1
(45) Date of Patent: May 21, 2002

(54) METHOD AND DEVICE FOR IDENTIFYING AN OBJECT AND DETERMINING ITS LOCATION

(75) Inventors: John B. Allen, Lucas, TX (US); Kent McCormack, Alexandria, VA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/330,953

(22) Filed: Jun. 11, 1999

(51) Int. Cl.[7] .......................... G01B 11/26; G01C 3/08; G06K 9/00
(52) U.S. Cl. ................... 356/141.1; 356/5.01; 382/103; 382/106
(58) Field of Search ................ 382/103, 106; 356/141.1, 5.01

(56) References Cited

U.S. PATENT DOCUMENTS

| | | | |
|---|---|---|---|
| 4,315,689 A | * | 2/1982 | Goda |
| 5,198,657 A | | 3/1993 | Trost et al. |
| 5,243,553 A | | 9/1993 | Flockencier |
| 5,357,331 A | | 10/1994 | Flockencier |
| 5,446,529 A | | 8/1995 | Stettner et al. |
| 5,528,354 A | * | 6/1996 | Uwira ........................ 356/5.01 |
| 5,638,164 A | * | 6/1997 | Landau ....................... 356/5.01 |
| 6,137,566 A | * | 10/2000 | Leonard et al. .......... 356/141.1 |

FOREIGN PATENT DOCUMENTS

WO     WO 96/39611     12/1996

* cited by examiner

*Primary Examiner*—Stephen C. Buczinski
(74) *Attorney, Agent, or Firm*—Baker Botts L.L.P.

(57) ABSTRACT

A reflected laser pulse (23) is received by a detector (34) which is a single component of a detector array (30). The reflected laser pulse is then amplified by an amplifier (36) and sent through a matched filter (38) to optimize the signal-to-noise ratio. A data sampler (40) takes samples of the reflected laser pulse (23) and stores the data samples within a temporary data storage (42). A comparator (44) compares each data sample in the temporary data storage (42) to a predetermined threshold constant to determine if the threshold constant has been exceeded. When the threshold constant is exceeded, the data from the temporary data storage (42) is sent to a buffer (48) where it is held while an analog-to-digital converter (50) digitizes the samples for use by a computer (26) in identifying an object and determining the location of the detected object. The identity and location of the detected object are displayed on a display device (32).

26 Claims, 4 Drawing Sheets

METHOD AND DEVICE FOR IDENTIFYING AN OBJECT AND DETERMINING ITS LOCATION

TECHNICAL FIELD OF THE INVENTION

This invention relates in general to the field of imaging systems and more particularly to an improved method and apparatus for identifying an object and determining its location.

BACKGROUND OF THE INVENTION

Object detection and ranging has traditionally been done by RADAR(Radio Detecting And Ranging) systems. Radar waves have a relatively long wavelength which creates a broad radar beam. In many detecting situations, the beam covers the entire target so it is difficult to obtain target shape information. Thus, RADAR cannot accurately determine the shape of an object for use in applications requiring target detection, recognition and identification. In recent years, LADAR (Laser Detecting And Ranging) systems have been introduced. LADAR systems use laser beams, which have a short wavelength, in place of the Radio waves. The short wavelength laser beam allows a much narrower beam with which to illuminate the target. The beam may be less than a meter in diameter. Therefore, the narrow laser beam may separately illuminate many points on the target and determine the range to each illuminated area. From these many measurements of range, the three dimensional shape of the target may be obtained allowing the target to be distinguished from non-targets (referred to as "clutter").

A LADAR system is an electro-optical system using a laser as an illuminator and a receiver which detects a return of the laser and converts the time taken for the return to a range value. Currently LADAR systems are of the scanning variety and referred to as scanning LADAR systems In this type of LADAR, a laser is pulsed at a high rate with one pulse per pixel (picture element) or portion of the target area to be studied. The laser is scanned such that each pixel in the field of view (FOV) is illuminated and detected. Each laser pulse may be reflected from the target area and received by a detector at the LADAR site. The receiver has a collection aperture and a detector with an instantaneous field of view (IFOV) which corresponds to the portion of the target area which is illuminated by the laser beam. The receiver IFOV is less than the FOV and hence defines the pixel location within the FOV.

The detector and the laser are scanned congruently so that the detector is always positioned to receive any reflected laser beams from the most recent laser pulse. After the entire target area has been scanned, the LADAR system has enough information to determine the approximate range to any object within the target area and the approximate shape of any detected object. Since the LADAR system can be mobile and objects within the target area are often mobile, distortion is introduced into the scanning LADAR system model due to the relative movement of the laser source and the target object during the scan of the LADAR. These distortions are manifested in inaccurate range determinations and imprecise shapes. In addition, purely analog range processors, such as those used with current scanning LADARs, are not as accurate as all digital or hybrid analog-digital range processors.

Flash LADAR systems have been introduced which solve the problems associated with scanning LADAR systems. However, flash LADAR systems have heretofore only been built on a demonstration basis and have been impractical due to their excessive size. Flash LADAR systems illuminate the entire target area with a single pulse from the laser. This laser pulse is then reflected from any object within the target area. Next, the reflected laser pulse is received and the object detected. A flash LADAR system requires many detectors arranged in a grid pattern, referred to as a detector array, so that it can recreate the target area and effectively determine the range and approximate shape of any objects contained within the FOV. The range and shape information may be used to identify an object and to determine the location of the object. Current detectors and their associated signal processing circuitry are constructed of analog circuitry which prevents the practical construction of a detector array since it would be excessively large A detector array followed by a fully digital processor would be optimal in terms of size. However, the data received by the detector array would be in excess of the capacity of any known processing device. Therefore, an all digital implementation of a detector array is not possible.

SUMMARY OF THE INVENTION

Accordingly, a need has arisen for a method and device in the area of detection systems which increases the accuracy of range, location, shape, and identity determinations and eliminates the distortions and inaccuracies associated with scanning LADAR systems. In accordance with the present invention, a device and method for determining a range and shape of an object are provided which substantially eliminate or reduce disadvantages and problems associated with conventional detection systems.

According to one embodiment of the present invention, a detection device is provided that comprises a detector which will receive laser light pulses which are reflected from an object in a target area. A data sampler then takes samples of the amplitude of the reflected laser light pulse. The detection device then compares the amplitude of each data sample to a predetermined threshold value. Once a data sample exceeds a threshold value, a computer using interpolation techniques can identify the object and determine a location of the object.

One important technical advantage of the present invention arises from the fact that inaccurate range and shape determinations in scanning LADAR systems caused by the relative movement of the laser source and the target are eliminated. The relative target and LADAR motion causes distortion since the scanning of the target takes time, such as one half second, and hence the range to various pixels on the target is measured at different times and distortions in the target shape occur. In contrast, the ranges in a flash LADAR are measured simultaneously in a single pulse, and therefore relative motion distortion does not occur. The flash LADAR effectively measures the range to each pixel and hence the target shape at the same instant in time The present invention allows flash LADAR systems of a practical size to be constructed. If a purely analog range processor, such as used with scanning LADARs, is connected to each detector, the volume of the processor would be prohibitively large. A purely digital processor may well have some volume advantages, but today's analog to digital converters (ADC) are far too slow to meet the processor requirements. The present invention uses a hybrid analog/digital processor which is small and compact enough to allow a flash LADAR of practical size to be constructed and yet provides highly accurate range measurement for target acquisition.

Yet another important advantage of the present invention relative to scanning LADAR systems is mechanical simplicity. The scanning LADAR requires complex and bulky mechanical or electronic scanners to scan the transmitted and returned laser beams. The flash LADAR does not require a scanner. In addition, the scanning LADAR must be stabilized to preserve the registration between pixels. Mechanical motion and jitter do not affect pixel registration in a flash LADAR since all pixel range measurements are made simultaneously during the instant the flash illuminates the target.

Another important technical advantage of the present invention arises from the fact that more accurate range and shape determinations are made using a hybrid analog/digital range processor rather than an all analog range processor. The hybrid analog/digital range processor may be used with scanning LADAR systems to provide more accurate range and shape determinations.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF THE INVENTION

Figure 1:
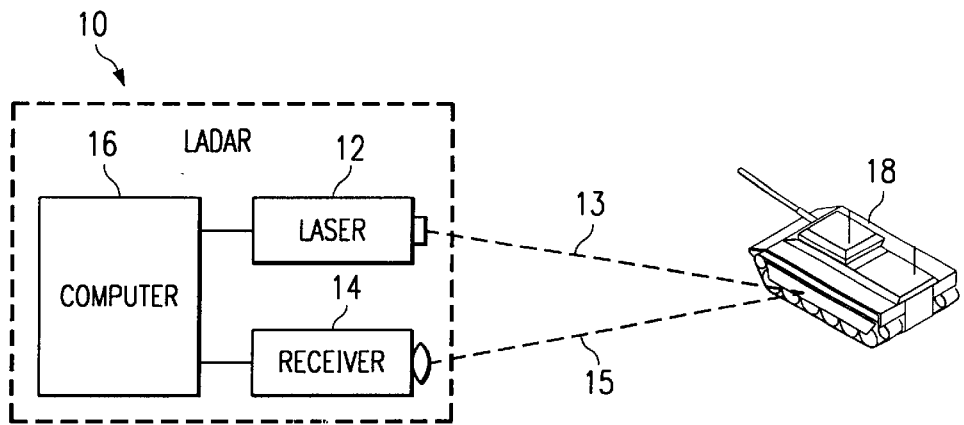
FIG. 1 is an environmental diagram illustrating a scanning LADAR detection device.

Referring to FIG. 1, a scanning LADAR detection device 10 is illustrated that comprises a laser 12, a receiver detector 14, and a computer 16. Detection device 10 is a scanning LADAR system configuration for laser detection and ranging of an object. Laser 12 is pulsed at a high rate while it scans the target area. The target area is logically divided into a grid where each portion of the grid defines a pixel (picture element) of the target area. The number of pixels is chosen such that a target object 18 may be accurately detected and identified. Each pulse of laser 12 illuminates a pixel of the target area. Laser 12 and receiver detector 14 are scanned congruently so that receiver detector 14 receives the laser pulse reflection from the portion of the target area most recently illuminated by laser 12. The reflected laser pulse information received from each pixel by receiver detector 14 is combined to recreate the entire target area.

Figure 2:
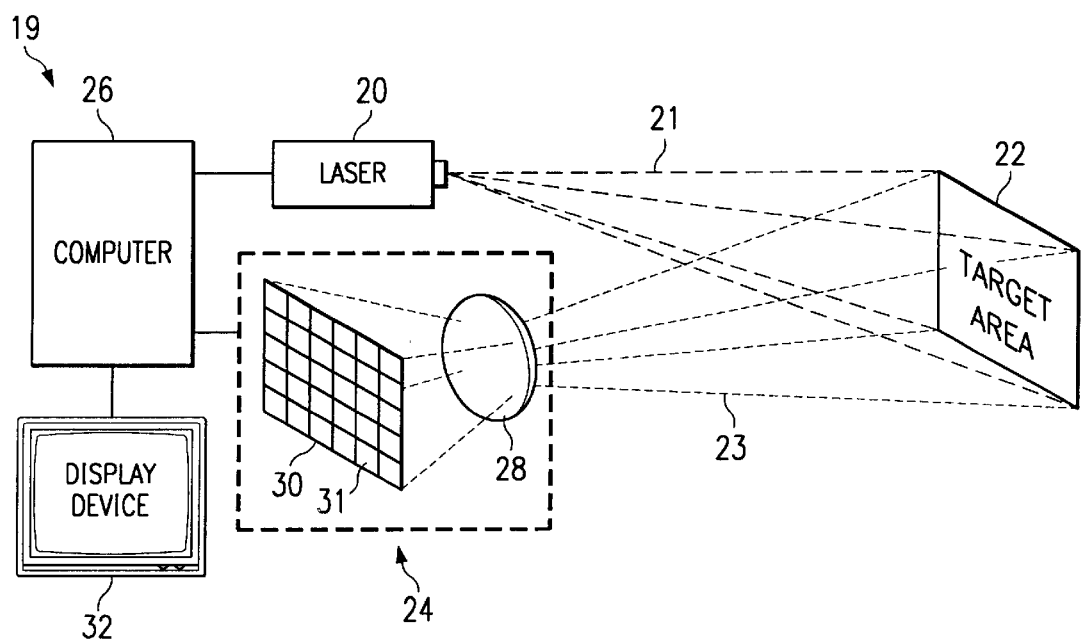
FIG. 2 is a simplified block diagram illustrating the component parts of a detection device for a Flash LADAR System.

Laser 12 emits a pulse of laser light 13 which is reflected off of target object 18 and received by receiver detector 14 as reflected laser light 15. Information from reflected laser light 15 is passed from receiver detector 14 to computer 16 where calculations regarding target object 18 range, shape, identity and location are performed after the entire FOV containing target object 18 has been scanned Scanning LADAR systems contain only a single detector, or at most a few detectors, in receiver detector 14 since the laser only illuminates one portion of the target area at a time. The detector in receiver detector 14 will determine if any objects exist based on the reflection of the single laser beam as it is scanned across the target area. Typical receiver detectors 14 contain purely analog detectors. More accurate range and shape determinations are possible using a hybrid analog/digital range processor which is the subject of the present invention. The circuitry described herein may be used with a scanning LADAR system in order to provide more accurate range determinations FIG. 2 illustrates a detection device 19 in a flash LADAR system configuration. A laser 20 emits a pulse of laser light which illuminates an entire target area 22. Any object within target area 22 will reflect the laser pulse back to a receiver 24 co-located with laser 20. When laser 20 emits a pulse of laser light 21, it sends a signal to computer 26 which then notifies receiver 24 that the laser has just illuminated target area 22. The purpose of this notification is so that the duration of time required for the pulse of laser light 21 to leave the laser, reflect off an object in the target area, and returned to receiver 24 can be recorded. This time duration can then be converted into range and location information by computer 26. A similar time differential process may be used with a scanning LADAR system as depicted in FIG. 1.

Since flash LADAR systems illuminate the entire target area, an array of detectors is necessary in order to capture reflections from the entire target area. Therefore, receiver 24 consists of a lens 28 which focuses the reflected laser beam on a detector array 30. Detector array 30 consists of multiple detectors 31 corresponding to specific portions of target area 22 illuminated by laser 20. Each detector 31 defines a pixel of target area 22. By combining the information from each pixel, the present invention can construct a three-dimensional image of the target area. In the preferred embodiment, the information received by detector array 30 is processed by a computer 26 in order to detect, recognize, and identify any target in the object area. The information is also used to determine the location of the detected object.

In the preferred embodiment, the identity and location of the detected object in target area 22 is displayed on a display device 32. In an alternate embodiment, display device 32 may also contain a visual representation of the detected object in target area 22. Computer 26 processes the information from detector array 30 in order to determine an approximate shape of an object in targeted area 22. The approximate shape information is compared to a database of potential targets in order to identify the target Detector array 30 consists of several detectors 31 arranged in a grid pattern with each detector 31 capable of gathering information related to a reflected laser beam 23 so that appropriate range and shape calculations can be performed by computer 26. Detector array 30 may, for example, consist of 10,000 detectors 31 arranged in a 100×100 grid. The 10,000 detectors 31 allow detector array 30 to sense the presence of an object at 10,000 different points within target area 22. The information from the 10,000 detectors 31 is then converted to range and shape information to be used to identify and locate the target.

Range processors which are used with current detectors, such as in scanning LADA systems, are constructed of analog circuitry which prevents a reduction in size necessary to build detector array 30. A fully digital detector circuit would be optimal in terms of size, however, the data rate received by detector device 19 would be in excess of 100 MHZ per detector with a 10 or 16 bit requirement. For a single flash LADAR system, that data rate would be multiplied by the number of detectors 31 within detector array 30. Thus, the total data rate would exceed the capabilities of any known analog-to-digital converter (ADC). In addition, the amount of data that would need to be processed by computer 26 would be excessive Therefore, an all digital implementation of a range processor following each detector 31 for detector array 30 is not possible The present invention combines analog and digital circuitry to create a range processor for each detector 31 in detector array 30 which is small enough to allow detector array 30 and the associated processor to be constructed. In addition, the present invention is capable of utilizing current analog-to-digital converters and current computers.

Figures 3, 4:
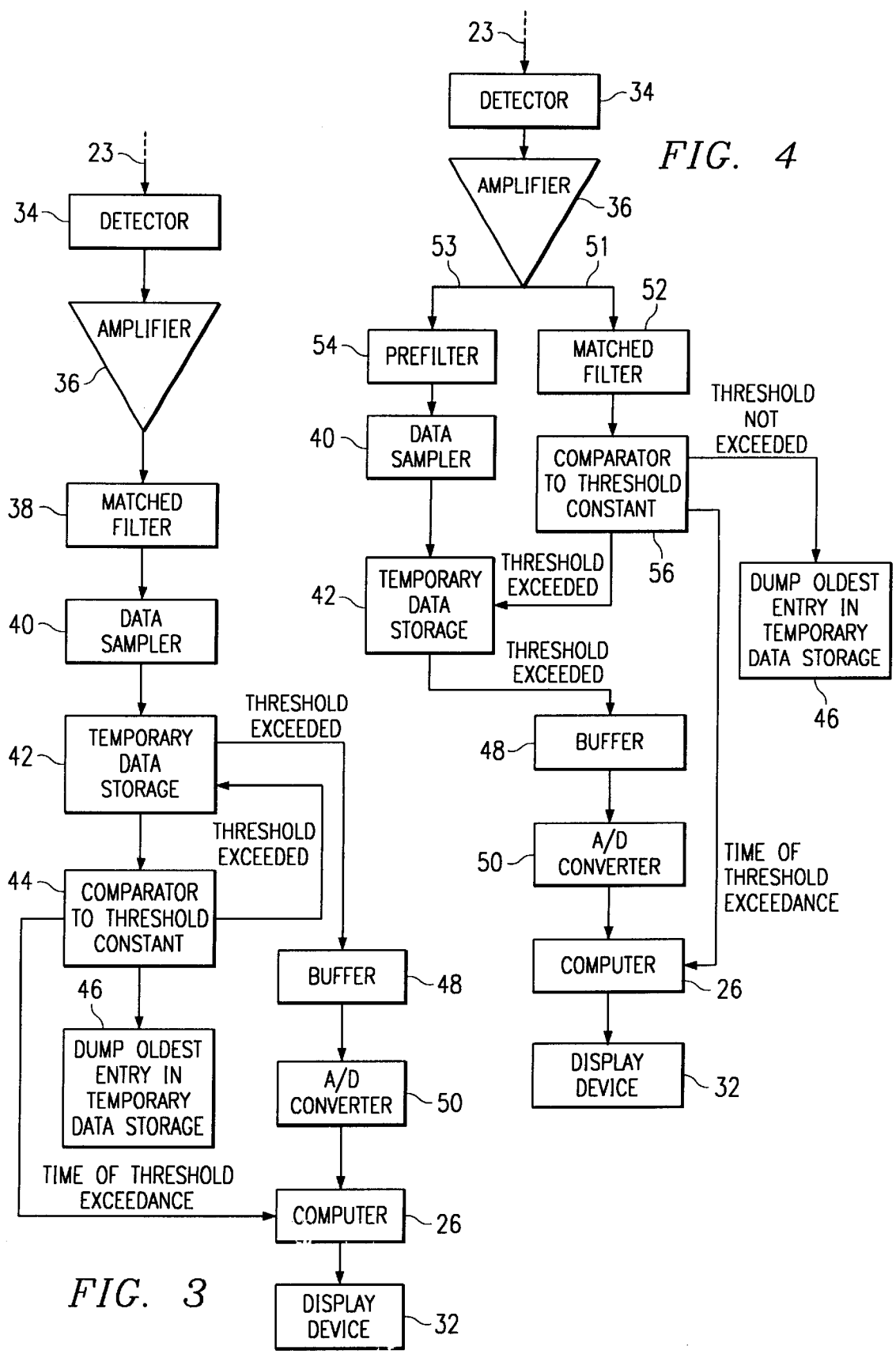
FIG. 3 is a schematic block diagram illustrating the detection device.
FIG. 4 is a schematic block diagram of an alternate embodiment of the detection device.

FIG. 3 is a schematic illustration of an individual detector and processor 31, shown in FIG. 2, within detector array 30 which is then connected to a system computer 26. FIG. 3 could also represent a schematic illustration of a portion of receiver detector 14 from a scanning LADAR system, as shown in FIG. 1, which is then connected to a computer 16. It should be understood that each detector 31 within detector array 30 is connected to the same computer 26. Detector 31 includes a detector receiver (not expressly shown) that receives a reflection of a laser pulse off of objects within a portion of target area 22 transmitted from laser 20. Reflected laser pulse 23 passes through lens 28 which focuses reflected laser pulse 23 on the part of detector array 30 corresponding to the portion of target area 22 which reflected the laser pulse. In the scanning LADAR application, the reflected laser pulse 15 passes through a lens which focuses the reflected laser pulse 15 on receiver detector 14. In the remainder of this specification, a detector 34 is used to generically refer to detector 31 in the flash LADAR system of FIG. 2 and receiver detector 14 of the scanning LADAR system of FIG. 1.

Referring again to FIG. 3, the output of detector 34 is coupled to an amplifier 36. Amplifier 36 increases the signal strength of reflected laser pulse 23 received by detector 34. The output of amplifier 36 is coupled to a matched filter 38 which optimizes the signal-to-noise ratio of the electrical signal generated by reflected laser pulse 23. The output of matched filter 38 is coupled to a data sampler 40.

Data sampler 40 receives the detected signal generated by reflected laser pulse 23 from matched filter 38 and proceeds to take samples of the amplitude of reflected laser pulse 23 at a predetermined rate. The number of samples taken by data sampler 40 may be seven samples for every laser pulse 21 of laser 20. The output of data sampler 40 is coupled to a temporary data storage 42 which receives and stores each data sample taken by data sampler 40. Temporary data storage 42 holds data samples of the amplitude of reflected laser pulse 23 at different points in time. The output of temporary data storage 42 is coupled to comparator 44.

As each data sample is placed in temporary data storage 42, comparator 44 compares the data sample to a predefined threshold constant. The threshold constant is a reference amplitude value which is compared to an amplitude value of each data sample of reflected laser pulse 23. A data sample of reflected laser pulse 23 exceeding the threshold constant signifies an object within target area 22 to be detected The threshold constant is set to a value dependent upon the probability of detection or false alarm which is acceptable for the application. A typical probability of detection may be 0.99 and a probability of false alarm may be 0.01 for the entire detector array.

In another embodiment, comparator 44 compares an analog output of matched filter 38 to the threshold constant. If the analog output of matched filter 38 exceeds the threshold constant, the data samples before and after the threshold exceedance are stored in temporary data storage 42. Throughout this detailed description, a reference to comparing data samples to a predefined threshold constant shall also include, alternatively, comparing the analog output of the matched filter to the predefined threshold constant.

As each data sample is stored in temporary data storage 42, comparator 44 compares the data sample to the threshold constant. If a sample does not exceed the threshold constant, the oldest sample in temporary data storage 42 is dumped at temporary data storage dump 46. When a data sample exceeds the threshold constant, the data sample which exceeded the threshold constant plus a predetermined number of samples before and after that data sample will be transferred to buffer 48 which is coupled to temporary data storage 42. The number of data samples is chosen such that reflected laser pulse 23 is captured for analysis.

One method of choosing the samples to be saved is to save the two or three samples which occur before and after the sample which exceeded the threshold constant. If several consecutive samples exceed the threshold constant, the two or three samples on either side of the largest sample should be sent to buffer 48. The required time of the exceedance of the largest sample relative to the time that the laser was fired is sent to computer 26. The time of exceedance will be used to determine the range and location of the detected object. The required time interval between the samples and the number of samples may be determined by the well known Nyquist Criterion. In addition, each new laser pulse 21 from laser 20 results in the dumping and initialization of temporary data storage 42 at temporary data storage dump 46.

Buffer 48 stores the data samples representing reflected laser pulse 23 for analysis by computer 26. Buffer 48 is coupled to an analog-to-digital converter 50 where the data samples are digitized and forwarded to computer 26 for analysis. Buffer 48 is necessary in detection device 19 in order to allow analog-to-digital converter 50 to digitize the samples at a rate lower than the rate at which temporary data storage 42 is accepting data.

Computer 26 analyzes the digitized data samples from buffer 48 and determines the time when the peak of reflected laser pulse 23 occurred. There are several algorithms which may take the samples, the time interval between the samples, and the time when the largest sample exceeded the threshold and infer the time of arrival of the peak of reflected laser pulse 23. One such method is to interpolate between the samples with a sin(x)/x function as dictated by the Nyquist Theorem. This time represents the length of time from the beginning of laser pulse 21 until the peak of reflected laser pulse 23 reaches detector 31. This length of time is then converted into a range based on the duration of time necessary for laser pulse 21 to go from laser 20 to target area 22 and back to receiver 24.

By utilizing information from each detector 31 within detector array 30, computer 26 can determine the three dimensional shape of an object within target area 22. Since detector array 30 may consist of 10,000 detectors 31, these 10,000 areas within target area 22 can be Converted into an approximate shape based on which detectors 31 within detector array 30 sensed an object. Target detection, recognition, and identification processes operate on the three dimensional shape and determine whether the object is a target, the class of the target, and the identity of the target. In addition, computer 26 may determine the location of the target. The location may be a set of map coordinates, a distance and direction, a distance relative to the center of target area 22, or any other suitable location identifier.

Computer 26 may then display the target information and location on display device 32. Computer 26 may also display the three dimensional image on display device 32.

In a scanning LADAR system, instead of having a detector array 30 defining a target area, the scanning LADAR system would have a number of laser pulses 13 equal to the number of pixels in the target area. The information for each reflected laser pulse 15 which exceeded the threshold constant would be forwarded to, and stored by, computer 16 for processing after the entire target area had been scanned.

FIG. 4 illustrates an alternate embodiment of the detector and processor 31 which provides for more accurate range and location determination. The embodiment illustrated in FIG. 4 operates in substantially the same manner as the embodiment illustrated in FIG. 3 except for the modifications described below. The alternate embodiment illustrated in FIG. 4 may also be used as a more accurate range processor in a scanning LADAR system. The output of amplifier 36 is split into a first amplifier output 51 and a second amplifier output 53. A matched filter 52 is coupled to first amplifier output 51. Matched filter 52 optimizes the peak signal-to-noise ratio of first amplifier output 51 in order to facilitate detection of the peak of reflected laser pulse 23.

A prefilter 54 is coupled to second amplifier output 53 in order to suppress aliasing. Data sampler 40 is coupled to prefilter 54 and receives the prefiltered signal. The data samples taken by data sampler 40 are stored in temporary data storage 42 which is coupled to data sampler 40. Temporary data storage 42 may consist of sampling capacitors. The sampling capacitors may have Johnson noise, which is well known in the art, stored on them. Since the Johnson noise is inserted into the circuit after prefilter 54, prefilter 54 does not reduce the Johnson noise. The output of amplifier 36 is split into first amplifier output 51 and second amplifier output 53 in order to reduce the effects of Johnson noise.

As in the embodiment illustrated in FIG. 3, a threshold amplitude value has been predetermined and is a constant within comparator 56. Comparator 56 is coupled to matched filter 52 and receives a signal therefrom for comparison to the threshold constant. If the signal from matched filter 52 exceeds the threshold constant, the time of exceedance is forwarded to computer 26 as in the description of FIG. 3 If the matched signal from matched filter 52 exceeds the threshold constant, the data samples in temporary data storage 42 are forwarded to buffer 48 for use by analog-to-digital converter 50 as described above with relation to FIG. 3. After being digitized by analog-to-digital converter 50, the data samples are forwarded to computer 26. If comparator 56 determines that the matched signal does not exceed the threshold constant, the oldest data sample in temporary data storage 42 is dumped as in the description of FIG. 3.

Once the data samples are digitized and stored in computer 26, a second matched filter (not expressly shown), which is implemented digitally on computer 26, may operate on the Johnson noise as well as the other noises present with reflected laser pulse 23. The peak of the second matched filter output, which is implemented in computer 26, will occur at a time which corresponds to the round trip time of laser pulse 21 reflecting off an object in target area 22 and returning to receiver 24. The second matched filter suppresses the Johnson noise allowing a more accurate estimate of the round trip laser pulse time and, therefore, a more accurate estimate of range.

Figure 5:
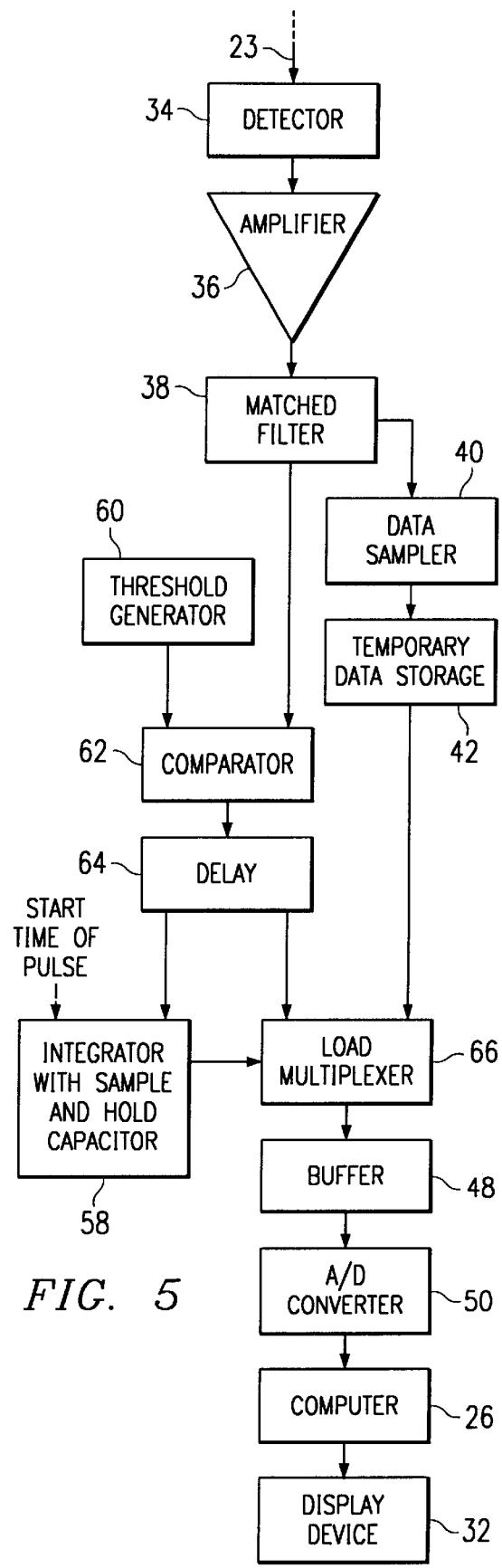
FIG. 5 is a schematic block diagram of an alternate embodiment of the detection device.

FIG. 5 illustrates another alternate embodiment of detector 31. This alternate embodiment applies equally to a detector associated with a scanning LADAR system. When laser pulse 21 is sent out, an integrator 58 is initialized and charges a sample-and-hold capacitor. The voltage on this sample-and-hold capacitor which is part of integrator 58 will be utilized by computer 26 to determine the elapsed time between the start of laser pulse 21 and the peak of reflected laser pulse 23. As in the prior embodiments, reflected laser pulse 23 is detected by detector 34 and processed by an amplifier 36 and a matched filter 38.

In this embodiment, matched filter 38 has two outputs. Comparator 62 determines if the first output of matched filter 38 exceeds a threshold generator 60 output. The second output of matched filter 38 is coupled to data sampler 40 which samples the second output of matched filter 38 at specified intervals of time. Temporary data storage 42 is coupled to data sampler 40 and receives and stores the data samples. Temporary data storage 42 may consist of five to seven sample-and-hold capacitors. A threshold generator 60 generates the threshold constant which the filtered signal must exceed to be a laser pulse return for processing. The threshold constant may be a learned value based on the matched filter 38 output in the absence of a reflected laser pulse 23.

When comparator 62 determines that the first output of matched filter 38 exceeds threshold generator 60 output, delay 64 is invoked which stops integrator 58 and its associated sample-and-hold capacitor and allows two to three additional samples to be taken by data sampler 40. Load multiplexer 66 is coupled to temporary data storage 42 and is operable to multiplex the data samples in temporary data storage 42 along with the sample-and-hold value held in integrator 58 when delay 64 completes its delay cycle. Integrator 58 sample-and-hold value represents the duration between the beginning of laser pulse 21 and the return of reflected laser pulse 23 exceeding the threshold value. The multiplexed data samples are sent to buffer 48 where they are temporarily stored prior to being digitized by analog-to-digital converter 50 and being processed by computer 26 as in the prior embodiments.

Figure 6:
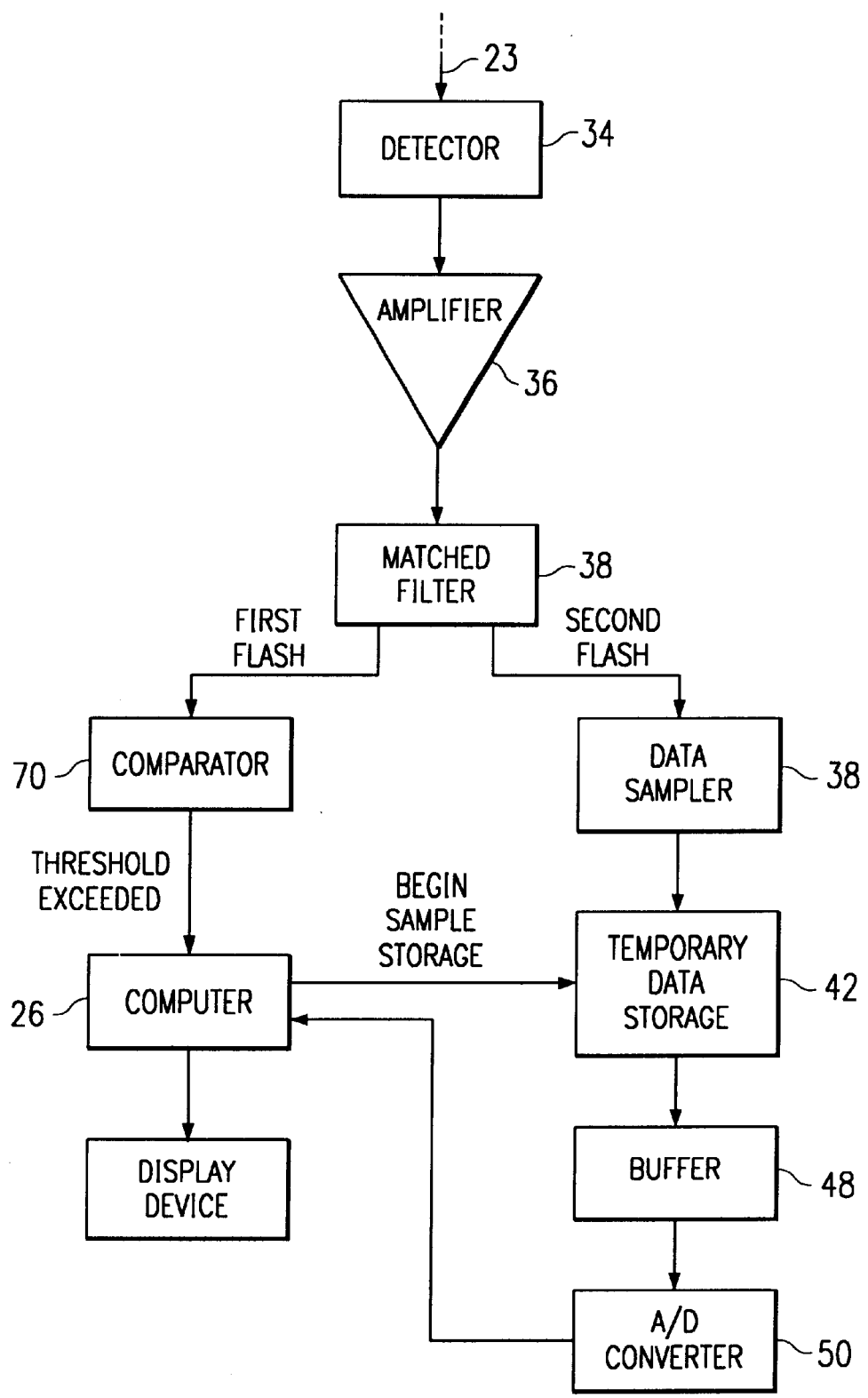
FIG. 6 is a schematic block diagram illustrating a dual flash version of the detection device.

FIG. 6 illustrates a dual flash LADAR receiver. During a first flash of laser 20, a few detectors 31 corresponding to the center of target area 22 are operated as a conventional laser range finder to determine the average range to an object. Laser 20 is then flashed a second time focusing on ranges near the average range determined in the first laser flash. In effect, the range information from the first flash of laser 20 is used as a range gate for the second flash of laser 20. The reflected laser pulse 23 is processed as in the previous embodiments, but a threshold value is not needed since detection system 20 already knows the range to the object and is thus only concerned with the approximate shape which may be used to identify the target Reflected laser pulse 23 from the first flash of laser 20 is received by detector 34 and amplified by amplifier 36. The resulting signal is filtered by matched filter 42 to maximize the signal to noise ratio. Comparator 70 compares the output of matched filter 38 to the predetermined threshold value. If the signal from the first flash of laser 20 exceeds the threshold value, the time of exceedance is forwarded to computer 26. The time of exceedance will be approximately the round trip time of the pulse of laser 20 and can be used to derive an approximate range to the target.

Reflected laser pulse 23 from the second pulse of laser 20 is detected by detector 34 and then amplified by amplifier 36. Data sampler 40, which is coupled to amplifier 36, then takes data samples at specified time intervals. Temporary data storage 42 is coupled to data sampler 40 and is operable to receive and store the data samples. When temporary data storage 42 is notified by computer 26 that the samples now being stored correspond to the ranges near the target as determined by the first flash of laser 20, the data in temporary data storage 42 is sent to buffer 48. As in the prior embodiments, analog-to-digital converter 50 is coupled to buffer 48 and is operable to digitize the data samples for processing by computer 26. It should be noted that the range determination from the first flash of laser 20 is stored in computer 26 for use in determining the location of the object. It should also be noted that the operation of the first flash of laser 20 has not been discussed in detail since laser range finders are currently in use.

According to the teachings of the present invention, a detection device is provided that allows for the identification of an object and the determination of its location. The advantage of this device is that it allows a laser pulse to be used to both identify an object and determine its location. Another advantage of this device is that it contains a detector and processor combination which is compact and highly efficient in terms of hardware as compared to other possible implementations of flash LADARs. Laser detection devices heretofore known have not provided for accurate range and shape determinations. The present invention provides for an accurate and compact processor which determines the range, shape, identity, and location of an object. If the present invention is used with a flash LADAR, the flash LADAR eliminates the introduction of distortions in the calculations caused by movements of both the laser source and the target object. Yet another important advantage of the present invention is a hybrid analog/digital range processor which is more accurate than purely analog range processors.

Although the present invention and its advantages have been described in detail, it should be understood that various changes, substitutions, and alterations can be made herein. For example, the number of detectors 31 and arrangement of detectors 31 within detector array 30 could be altered. Other examples may be readily ascertained by those skilled in the art without departing from the spirit and scope of the invention as defined by the following claims.

What is claimed is:

1. A method, comprising the steps of:
    transmitting a pulse of electromagnetic energy toward a scene;
    using a specified detector element to generate an output signal representative of electromagnetic energy which is received by said detector element and which includes energy of said pulse reflected from said scene;
    generating a matched filter signal by effecting matched filtering of a signal which is a function of said output signal from said detector element, said matched filtering being matched to said transmitted pulse;
    comparing said matched filter signal to a predetermined threshold to determine when said matched filter signal exceeds said threshold;
    producing a series of data samples by effecting periodic sampling of a signal which is a function of said output signal from said detector element;
    saving a predetermined number of successive said data samples, including the step of being responsive to each new data sample produced in said sampling step by saving the new data sample while discarding the oldest of said predetermined number of saved data samples;
    responding to a determination that said matched filter signal exceeds said threshold by waiting while a selected number of subsequent said data samples are saved in said saving step and by then inhibiting further execution of said saving step; and
    thereafter processing said predetermined number of data samples saved in said saving step.

2. A method according to claim 1, including the step of selecting said selected number of data samples to be approximately one-half of said predetermined number of data samples.

3. A method according to claim 2, wherein said selecting step includes the step of selecting said predetermined number of data samples to be 7 and said selected number of data samples to be 3.

4. A method according to claim 1, wherein said signal subjected to said periodic sampling is a function of said matched filter signal.

5. A method according to claim 1, including the steps of:
    generating a further filter signal by effecting anti-aliasing filtering of a signal which is a function of said output signal from said detector element; and
    causing said signal subjected to said periodic sampling to be a function of said further filter signal.

6. A method according to claim 1, wherein said transmitting step is carried out by transmitting said pulse of electromagnetic energy in the form of laser light.

7. A method according to claim 1, wherein said comparing step is carried out by comparing said threshold directly to said matched filter signal.

8. A method according to claim 1, wherein said comparing step is carried out by effecting a comparison of said threshold to each new data sample produced in said sampling step.

9. A method according to claim 1, including the step of providing a detector having a plurality of said detector elements, one of said detector elements of said detector being said specified detector element; and
    carrying out independently for each of said detector elements said steps of using, generating, comparing, producing, saving and responding.

10. An apparatus, comprising:
    a transmitting section for transmitting a pulse of electromagnetic energy toward a scene;
    a detector having a specified detector element that generates an output signal representative of electromagnetic energy which is received by said detector element and which includes energy of said pulse reflected from said scene;
    a matched filter which generates a matched filter signal by effecting matched filtering of a signal which is a function of said output signal from said detector element, said matched filtering being matched to said transmitted pulse;
    a comparator which compares said matched filter signal to a predetermined threshold to determine when said matched filter signal exceeds said threshold;
    a sampling section which produces a series of data samples by effecting periodic sampling of a signal which is a function of said output signal from said detector element;
    a storage section which saves a predetermined number of successive said data samples, said storage section being responsive to each new data sample from said sampling section for saving the new data sample while discarding the oldest of said predetermined number of saved data samples;
    a control section responsive to a determination by said comparator that said matched filter signal exceeds said threshold for waiting while a selected number of subsequent said data samples are saved in said storage section and for then causing said storage section to ignore further data samples produced by said sampling section; and a processing section for thereafter processing said predetermined number of data samples saved in said storage section.

11. An apparatus according to claim 10, wherein said selected number of data samples is approximately one-half of said predetermined number of data samples.

12. An apparatus according to claim 11, wherein said predetermined number of data samples is 7 and said selected number of data samples is 3.

13. An apparatus according to claim 10, wherein said signal subjected to said periodic sampling by said sampling section is a function of said matched filter signal.

14. An apparatus according to claim 10,
including an anti-aliasing filter which generates a further filter signal by effecting anti-aliasing filtering of a signal which is a function of said output signal from said detector element; and
wherein said signal subjected to said periodic sampling is a function of said further filter signal.

15. An apparatus according to claim 10, wherein said transmitting section includes a laser, and effects transmission of said pulse of electromagnetic energy in the form of laser light.

16. An apparatus according to claim 10, wherein said comparator effects comparison of said threshold directly to said matched filter signal.

17. An apparatus according to claim 10, wherein said comparator effects comparison of said threshold to each new data sample produced by said sampling section.

18. An apparatus, comprising:
a transmitting section for transmitting a pulse of electromagnetic energy toward a scene;
a detector having a plurality of detector elements which each generate an output signal representative of electromagnetic energy which is received by that detector element and which includes energy of said pulse reflected from said scene;
a plurality of matched filters which are each coupled to a respective said detector element and which each generate a respective matched filter signal by effecting matched filtering of a signal which is a function of said output signal from the detector element coupled thereto, each said matched filter effecting filtering which is matched to said transmitted pulse;
a plurality of comparators which each compare a respective said matched filter signal to a predetermined threshold in order to determine when that matched filter signal exceeds the threshold;
a plurality of sampling sections which are each associated with a respective said detector element and which each produce a series of data samples by effecting periodic sampling of a signal which is a function of said output signal from the associated detector element;
a storage section which saves a predetermined number of successive said data samples for each said detector element, said storage section being responsive to each new data sample from each said sampling section for saving the new data sample while discarding the oldest of said predetermined number of saved data samples for that sampling section;
a control section responsive to a determination by each said comparator that the matched filter signal supplied to that comparator exceeds the corresponding threshold for waiting while a selected number of subsequent said data samples for the associated detector element are saved in said storage section and for then causing said storage section to ignore further data samples produced for the associated detector element; and a processing section for thereafter processing said predetermined number of data samples saved in said storage section for each of said detector elements.

19. A method, comprising the steps of:
providing a detector having a plurality of detector elements arranged in first and second sets, said second set being larger than said first set;
transmitting a first pulse of electromagnetic energy toward a scene;
using each said detector element in said first set to generate a respective output signal representative of electromagnetic energy which is received by that detector element and which includes energy of said first pulse reflected from said scene;
generating for each said detector element of said first set a respective matched filter signal by effecting matched filtering of a signal which is a function of the output signal of that detector element, said matched filtering being matched to said transmitted first pulse;
comparing each said matched filter signal to a predetermined threshold to identify a point in time when that matched filter signal exceeds the threshold;
determining as a function of each of said points in time identified for respective said detector elements in said first set a first time interval which begins at the end of a second time interval following transmission of said first pulse;
transmitting a second pulse of electromagnetic energy toward the scene at a time subsequent to transmission of said first pulse;
using each said detector element in said second set to generate a respective output signal representative of electromagnetic energy which is received by that detector element and which includes energy of said second pulse reflected from said scene;
producing for each said detector element in said second set a series of data samples by effecting periodic sampling of a signal which is a function of the output signal from that detector element;
saving for each said detector element of said second set a set of successive said data samples which are produced during a first time period which is equal in duration to said second time interval, said first time period beginning at the end of a second time period following the transmission of said second pulse, said second time period having a duration equal to said first time interval; and
thereafter processing said sets of data samples saved during said saving step for said detector elements of said second set.

20. A method according to claim 19, wherein said step of determining said first time interval includes the steps of:
averaging said points in time identified for respected said detector elements in said first set to obtain an average point in time; and
selecting said first time interval to include said average point in time.

21. A method according claim 19, wherein said steps of transmitting said first and second pulses are each carried out by transmitting a pulse of laser light.

22. A method according to claim 19, including after said step of transmitting said second pulse the step of generating for each said detector element of said second set a respective further matched filter signal by effecting matched filtering of a signal which is a function of the output signal of that detector element; and wherein said signal subjected to periodic sampling for each said detector element of said second set is a function of said further matched filter signal for that detector element.

23. An apparatus, comprising:

a transmitter section which transmits a first pulse of electromagnetic energy toward a scene, and subsequently transmits a second pulse of electromagnetic energy toward the scene;

a detector having a plurality of detector elements arranged in first and second sets, said second set being larger than said first set, each said detector element in said first set being operative following transmission of said first pulse to generate a respective output signal representative of electromagnetic energy which is received by that detector element and which includes energy of said first pulse reflected from said scene, and each said detector element in said second set being operative following transmission of said second pulse to generate a respective output signal representative of electromagnetic energy which is received by that detector element and which includes energy of said second pulse reflected from said scene;

a plurality of matched filters which are each coupled to an output of a respective one of said detector elements of said first set, each said matched filter generating a respective matched filter signal by effecting matched filtering of a signal which is a function of the output signal of the associated detector element, each said matched filter being operative following transmission of said first pulse to effect filtering which is matched to said transmitted first pulse;

a plurality of comparators which each compare a respective said matched filter signal to a predetermined threshold in order to identify a point in time when that matched filter signal exceeds the threshold;

a processing section which determines as a function of each of said points in time identified for respective said detector elements in said first set a first time interval which begins at the end of a second time interval following transmission of said first pulse;

a plurality of sampling circuits which are each operative following transmission of said second pulse to produce for a respective said detector element in said second set a series of data samples through periodic sampling of a signal which is a function of the output signal from that detector element; and a storage section for saving for each said detector element of said second set a set of successive said data samples which are produced by a respective said sampling circuit during a first time period which is equal in duration to said second time interval, said first time period beginning at the end of a second time period following the transmission of said second pulse, said second time period having a duration equal to said first time interval;

wherein after said first time period said processing section is operative to process said sets of data samples saved during said saving step for said detector elements of said second set.

24. An apparatus according to claim 23, wherein said processing section is operative to effect said determination of said first time interval by averaging said points in time identified for respective said detector elements in said first set so as to determine an average point in time, and by then selecting said first time interval to include said average point in time.

25. An apparatus according to claim 24, wherein said transmitter section includes a laser, and is operative to effect transmission each of said first and second pulses in the form of a pulse of laser light.

26. An apparatus according to claim 24, wherein each of said detector elements of said second set is coupled to a respective one of said matched filters, each said matched filter being operative following transmission of said second pulse to effect filtering which is matched to said transmitted second pulse; and wherein said periodic sampling effected by each said sampling circuit is carried out on a signal which is a function of said further matched filter signal for the detector element associated with that sampling circuit.

* * * * *

UNITED STATES PATENT AND TRADEMARK OFFICE
CERTIFICATE OF CORRECTION

PATENT NO. : 6,392,747 B1
DATED : May 21, 2002
INVENTOR(S) : John B. Allen et al.

It is certified that error appears in the above-identified patent and that said Letters Patent is hereby corrected as shown below:

Column 1,
Line 36, after "systems", insert -- . --.

Column 2,
Line 14, after "large", insert -- . --.

Column 3,
Line 64, after "scanned", insert -- . --.

Column 4,
Line 9, after "determinations", insert -- . --.
Line 46, after "target", insert -- . --.
Line 46, after "target.", start a new paragraph beginning with "Detector".
Line 59, after "scanning", delete "LADA" and insert -- LADAR --.

Column 5,
Line 3, after "excessive," insert -- . --.
Line 5, after "possible", insert -- . --.

Column 6,
Line 58, after "be", delete "Converted" and insert -- converted --.

Column 7,
Line 44, after "3", insert -- . --.

Column 8,
Line 53, after "target", insert -- . --.

UNITED STATES PATENT AND TRADEMARK OFFICE
CERTIFICATE OF CORRECTION

PATENT NO. : 6,392,747 B1
DATED : May 21, 2002
INVENTOR(S) : John B. Allen et al.

It is certified that error appears in the above-identified patent and that said Letters Patent is hereby corrected as shown below:

<u>Column 14,</u>
Line 31, after "claim", delete "24" and insert -- 23 --.
Line 35, after "claim", delete "24" and insert -- 23 --.

Signed and Sealed this

Seventeenth Day of December, 2002

JAMES E. ROGAN
*Director of the United States Patent and Trademark Office*